US012568426B2

(12) United States Patent
Ge et al.

(10) Patent No.: US 12,568,426 B2
(45) Date of Patent: Mar. 3, 2026

(54) COMMUNICATION METHOD, DEVICE AND SYSTEM OF AMBIENT BACKSCATTERING BASED ON WI-FI SIGNALS

(71) Applicant: Nokia Solutions and Networks Oy, Espoo (FI)

(72) Inventors: Shang Bin Ge, Shanghai (CN); Jun Jun Chen, Changzhou (CN); Gang Cheng, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 381 days.

(21) Appl. No.: 18/178,402

(22) Filed: Mar. 3, 2023

(65) Prior Publication Data

US 2023/0284123 A1      Sep. 7, 2023

(30) Foreign Application Priority Data

Mar. 4, 2022    (CN) .......................... 202210208746.6

(51) Int. Cl.
| | |
|---|---|
| *H04W 48/16* | (2009.01) |
| *H04B 7/22* | (2006.01) |
| *H04L 5/00* | (2006.01) |
| *H04W 72/0446* | (2023.01) |

(52) U.S. Cl.
CPC .............. *H04W 48/16* (2013.01); *H04B 7/22* (2013.01); *H04L 5/0048* (2013.01); *H04W 72/0446* (2013.01)

(58) Field of Classification Search
CPC ........ H04B 7/22; H04L 5/0048; H04W 48/16; H04W 72/0446; H04W 48/14; H04W 84/12
See application file for complete search history.

(56) References Cited

U.S. PATENT DOCUMENTS

2006/0267735 A1* 11/2006 Ovard .................. G06K 7/0008
340/572.4

FOREIGN PATENT DOCUMENTS

JP          H1023055 A  *  1/1998

* cited by examiner

*Primary Examiner* — Zhensheng Zhang
(74) *Attorney, Agent, or Firm* — Harness, Dickey & Pierce, P.L.C.

(57) ABSTRACT

The objective of the embodiments of the present disclosure is to provide a method, device and system for backscatter communication based on Wi-Fi signals. Wherein, a Wi-Fi signal reader device broadcasts periodically a device query message to instruct backscatter communication devices upon receiving the device query message to report their respective device ID information; said backscatter communication devices report their device ID information to said Wi-Fi signal reader device in response to said device query message; said Wi-Fi signal reader device counts the number of the backscatter communication devices that have reported their respective device ID information, and allocates to them the corresponding time slot information.

13 Claims, 10 Drawing Sheets

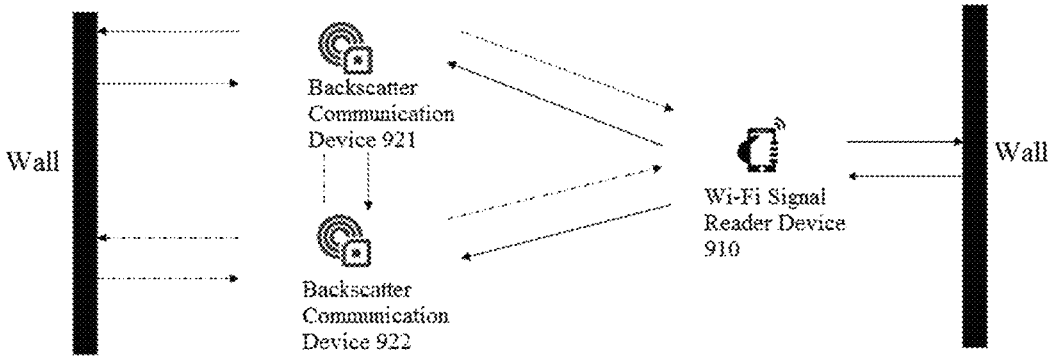

Backscatter
Communication
Device 921

Backscatter
Communication
Device 922

Wi-Fi Signal
Reader Device
910

Wall

Wall

——————————→  Broadcast message sent by the Wi-Fi signal reader device 910 with ID field being all '0's
····················→  Reflection message sent by the backscatter communication device 921 with ID field being the ID
                of the backscatter communication device 921
– · – · – · – · →  Reflection message sent by the backscatter communication device 922 with ID field being the ID
                of the backscatter communication device 922

Fig. 9

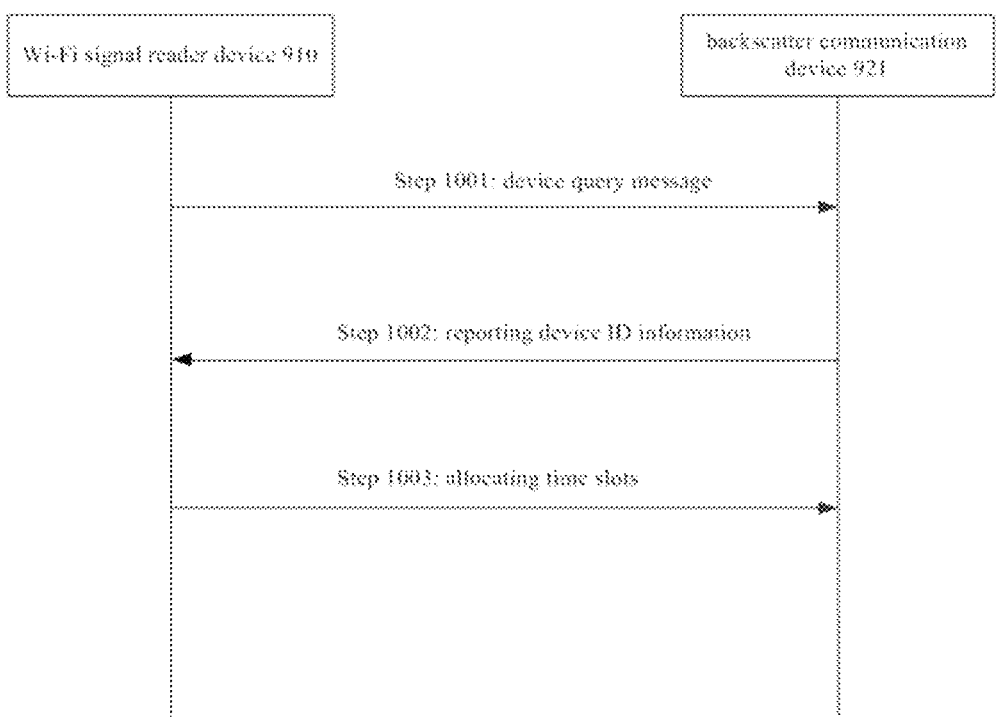

Wi-Fi signal reader device 910 backscatter communication
device 921

Step 1001: device query message

Step 1002: reporting device ID information

Step 1003: allocating time slots

Fig. 10 backscatter communication
devices 921 backscatter communication
devices 922

Wi-Fi signal reader
device 910

| Time slots for device 921 | Time slots for device 922 | Time slots for device 921 | Time slots for device 922 |
|---|---|---|---|

Data of device 921

Data of device 922

COMMUNICATION METHOD, DEVICE AND SYSTEM OF AMBIENT BACKSCATTERING BASED ON WI-FI SIGNALS

CROSS-REFERENCE TO RELATED APPLICATIONS

This application claims priority to and the benefit of Chinese Patent Application No. 202210208746.6 filed on Mar. 4, 2022, the entire contents of each of which are incorporated herein by reference.

TECHNICAL FIELD

The embodiments of the present disclosure relate to the technical field of wireless Internet of Things, in particular to an ambient backscatter technology based on Wi-Fi signals.

BACKGROUND ART

The backscatter communication solution using Wi-Fi signals is emerging as an alternative to passive wireless communication. The backscatter communication device transmits data by changing a set of amplitudes and phases of Wi-Fi packets through backscattering an ambient RF signal.

The backscatter devices have rather low complexity and power consumption in deployment of Internet of Things, because such devices can harvest power from the ambient RF signals and do not need certain Wi-Fi chips. Compared to other passive wireless communication solutions like UHF RFID and NFC, the backscatter communication solution can utilize the already installed Wi-Fi infrastructure, and therefore no additional cost is needed to set up the wireless network. Furthermore, since Wi-Fi related deployment is already quite widespread globally, it will be efficient and effective to utilize Wi-Fi signals as ambient RF signals to transmit backscattered data from anywhere. In addition, if the backscatter communication devices can be powered entirely by harvesting ambient RF energy, this will give people a great incentive to build backscatter communication systems without installing batteries.

SUMMARY OF THE INVENTION

The objective of the embodiments of the present disclosure is to provide a communication method, device and system of ambient backscattering based on Wi-Fi signals.

In accordance with an aspect of the present disclosure, there is provided a communication method of ambient backscattering based on Wi-Fi signals. Wherein, a Wi-Fi signal reader device periodically broadcasts a device query message to instruct backscatter communication devices upon receiving said device query message to report their respective device ID information; said backscatter communication devices report their device ID information to said Wi-Fi signal reader device in response to said device query message; said Wi-Fi signal reader device counts the number of the backscatter communication devices that have reported their respective device ID information, and allocates to them the corresponding time slot information.

In accordance with an example of the present disclosure, the messages transmitted between said Wi-Fi signal reader device and said backscatter communication device include a device ID field and a time slot information field, wherein said device ID field is used for indicating the device ID of said backscatter communication device, and the time slot information field is used for indicating the time slot information allocated to said backscatter communication device.

In accordance with an example of the present disclosure, said Wi-Fi signal reader device allocates the time slots evenly according to the number of the backscatter communication devices that have reported their respective device ID information.

In accordance with an example of the present disclosure, after completion of the time slot configuration, said backscatter communication device carries out backscatter communication with said Wi-Fi signal reader device according to the allocated time slots.

In accordance with an example of the present disclosure, said backscatter communication device arranges 2 bits into one group to indicate bit '1' to the Wi-Fi signal reader device with the bit group '10', and to indicate bit '0' to the Wi-Fi signal reader device with the bit group '01'.

In accordance with an aspect of the present disclosure, there is also provided a Wi-Fi signal reader device that carries out backscatter communication based on Wi-Fi signals, wherein said Wi-Fi signal reader device comprises a processor and a memory with computer executable instructions included therein, and said Wi-Fi signal reader device is configured to perform the following operations when said computer executable instructions are executed by said processor:

broadcasting periodically a device query message to instruct backscatter communication devices upon receiving said device query message to report their respective device ID information; and counting the number of the backscatter communication devices that have reported their respective device ID information, and allocating to them the corresponding time slot information.

In accordance with an example of the present disclosure, said Wi-Fi signal reader device carries out error correction on the received information according to the same message sent consecutively by said backscatter communication device, wherein the error bits in said at least two same messages that are sent consecutively do not overlap.

In accordance with an aspect of the present disclosure, there is also provided a backscatter communication device that carries out backscatter communication based on Wi-Fi signals, wherein said backscatter communication device comprises a processor and a memory with computer executable instructions included therein, and said backscatter communication device is configured to perform the following operations when said computer executable instructions are executed by said processor:

reporting its own device ID information to a Wi-Fi signal reader device in response to the device query message therefrom; and acquiring the time slot information allocated by said Wi-Fi signal reader device.

In accordance with an example of the present disclosure, said operation of acquiring said time slot information further includes: receiving the time slot allocation message from said Wi-Fi signal reader device; and responding to said Wi-Fi signal reader device with a response message according to the allocated time slot information.

In accordance with an example of the present disclosure, before reflecting a message, said backscatter communication device: waits randomly for a period of time in a time slot, and continues to wait till the next time slot if it receives any message reflected by other backscatter communication devices; performs the same operation in said next time slot until no more conflict is detected in the time slot that follows, then transmits a message to said Wi-Fi signal reader device.

In accordance with an aspect of the present disclosure, there is also provided a communication system of ambient backscattering based on Wi-Fi signals, wherein the system comprises a Wi-Fi signal reader device that carries out backscatter communication based on Wi-Fi signals as mentioned above in accordance with an aspect of the present disclosure and a backscatter communication device that carries out backscatter communication based on Wi-Fi signals as mentioned above in accordance with an aspect of the present disclosure.

The embodiments of the present disclosure provide a novel backscatter communication solution that supports ambient backscattering based on Wi-Fi signal transmission. By adding the device ID and time slot information in the backscatter communication messages transmitted between the Wi-Fi signal reader device and the backscatter communication device, the embodiments of the present disclosure can identify the backscatter communication devices in the environment. Furthermore, by arranging 2 bits into one group, the backscatter communication device indicates bit '1' to the Wi-Fi signal reader device with the bit group '10' and indicates bit '0' to the Wi-Fi signal reader device with the bit group '01', and therefore the embodiments of the present disclosure can effectively reduce error bits caused by interference. Since the backscatter communication device will reflect the same message consecutively for multiple times, the Wi-Fi signal reader device can correct errors on its own whenever the error bits do not overlap in the same message received each time.

DESCRIPTION OF THE DRAWINGS

Through reading the detailed description of the non-limiting embodiments with reference to the following drawings, other features, objects and advantages of the present disclosure will become more obvious:

FIG. 9 shows the schematic view of the backscatter communication system based on Wi-Fi signals in accordance with an example of the present disclosure;

FIG. 10 shows the schematic flowchart of the backscatter communication process based on Wi-Fi signals in accordance with an example of the present disclosure;

The same or similar reference numbers in the drawings represent the same or similar parts.

DETAILED DESCRIPTION OF THE EMBODIMENTS

Figure 1:
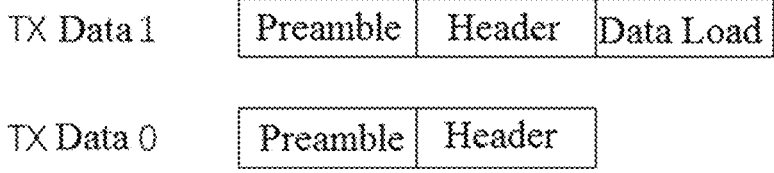
FIG. 1 shows the schematic view of the representation of bits 0 and 1 in the current backscatter communication message.

The specific embodiments of the present disclosure will be described in further detail in the following in connection with the drawings.

Before discussing example embodiments in more detail, it is noted that some example embodiments of the present disclosure are described as apparatuses depicted by block diagrams and processes or methods depicted by flowcharts. Although the flowcharts describe the operations of the embodiments of the present disclosure as sequential processes, many of the operations may be executed in parallel, concurrently, or simultaneously. In addition, the order of operations may be re-arranged. The processes of the embodiments of the present disclosure may be terminated when their operations are completed, but may also include additional steps not shown in the flowcharts. The processes of the embodiments of the present disclosure may correspond to methods, functions, procedures, subroutines, subprograms, etc.

The methods illustrated by flowcharts and apparatuses illustrated by block diagrams that will be discussed in the following may be implemented by hardware, software, firmware, middleware, microcode, hardware description languages, or any combination thereof. When implemented by software, firmware, middleware or microcode, the program code or code segments used to carry out the necessary tasks may be stored in a machine or computer readable medium, such as a storage medium. A processor(s) may carry out the necessary tasks.

Similarly, it will be appreciated that any flow charts, flow diagrams, state transition diagrams, pseudo code, and the like represent various processes which may be substantially described as program code stored in a computer readable medium and so executed by a computing device of processor, whether or not such computing device or processor is explicitly shown.

As disclosed herein, the term 'storage medium' may represent one or more devices for storing data, including read only memory (ROM), random access memory (RAM), magnetic RAM, core memory, magnetic disk storage mediums, optical storage mediums, flash memory devices and/or other machine-readable mediums for storing information. The term 'computer-readable medium' may include, but is not limited to, portable or fixed storage devices, optical storage devices, and various other mediums capable of storing and/or containing instruction(s) and/or data.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The specific structural and functional details disclosed herein are merely representative and serve the purpose of describing example embodiments of the present disclosure. However, the embodiments of the present disclosure may be embodied in many alternative forms, and should not be construed as limited to only the embodiments set forth herein.

It will be understood that although the terms 'first', 'second', etc. may be used herein to describe various elements, these elements should not be limited by these terms. These terms are used only to distinguish one element from another. For example, a first element could be termed a second element, and, similarly, a second element could be termed a first element, without departing from the scope of example embodiments. As used herein, the term 'and/or' includes any and all combinations of one or more of the associated items that are listed.

The terminology used herein is for the purpose of describing particular embodiments only and is not intended to be limiting of example embodiments. As used herein, the singular forms 'a', 'an' and 'the' are intended to include the plural forms as well unless clearly indicated otherwise in the context. It will be further understood that the terms 'comprises', 'comprising', 'includes' and/or 'including', when used herein, specify the presence of the stated features, integers, steps, operations, elements and/or components, and do not preclude the presence or addition of one or more other features, integers, steps, operations, elements, components and/or combinations thereof.

It should also be noted that in some alternative implementations, the functions/acts mentioned may occur out of the order denoted in the figures. For example, two figures shown in succession may actually be executed substantially simultaneously or may sometimes be executed in the reverse order, depending upon the functions/acts involved.

As for the commercialized application of the Wi-Fi backscatter communication system, there still exist many challenges and constraints, for example, low data rate of backscattering, short communication range, presence of wireless interference in the environment, etc. In addition, adding Wi-Fi chipsets in the system to improve the Wi-Fi signal transmission is also not a desirable solution for low power consumption.

Accordingly, the present disclosure proposes a novel solution for backscatter communication with multiple communication devices supporting there between ambient backscattering using Wi-Fi signal transmission. In a backscatter communication system, backscatter communication based on Wi-Fi signal transmission may be carried out between one Wi-Fi signal reader device and at least one backscatter communication device. The backscatter communication device has a Wi-Fi chip installed therein for generating Wi-Fi backscatter signals and resolving Wi-Fi signals from the Wi-Fi signal reader device. The Wi-Fi signal reader device may generate Wi-Fi signals and resolve Wi-Fi backscatter signals from the backscatter communication device.

In the discussion of the present disclosure, the Wi-Fi chip installed in the backscatter communication device can be seen as a 'backscatter tag', and the 'backscatter communication device' has a one-to-one correspondence with the 'backscatter tag'. Accordingly, the 'backscatter communication device' and the 'backscatter tag' can be used equivalently hereinafter, both of which may refer to the 'backscatter communication device'.

The backscatter communication device may be, for example, various sensors in the IoT with Wi-Fi chips installed therein, the examples of which are thermometer, smoke detector, etc. The term 'sensor' used herein should be interpreted in a broad sense, including but not limited to various sensing means used for data acquisition deployed in the IoT. These sensing means upload the data they acquired to the devices in the next stage for data relay or data processing or the like.

The Wi-Fi signal reader device may be, for example, a device that is capable of receiving and resolving the backscatter RF signals from the backscatter communication devices in the Wi-Fi environment, such as a router, access point (AP), user equipment, etc.

In the current backscatter communication system, the Wi-Fi signal reader device indicates binary bits '1' or '0' based on whether the Wi-Fi message contains a data load. With reference to FIG. 1, the Wi-Fi message sent by the Wi-Fi signal reader device consists of a preamble, a header and a data load. If the Wi-Fi message is filled with a data load, it indicates that the transmitted bit is '1', and if the Wi-Fi message is not filled with a data load, it indicates the transmitted bit is '0'.

Figure 2:
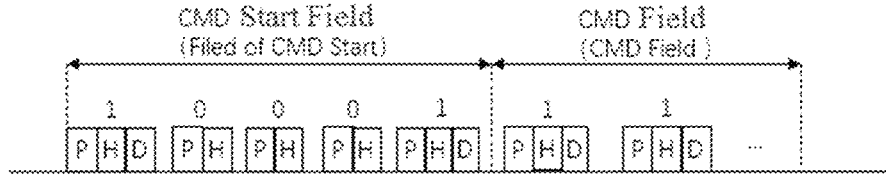
FIG. 2 shows the schematic view of the structure of the current backscatter communication message.

With reference to FIG. 2, in the backscatter communication message, the start of the backscatter communication command is indicated by the CMD Start field, and the various instructions issued to the backscatter communication device are defined through the CMD field.

When there are multiple backscatter communication devices in the environment, the Wi-Fi signal reader device cannot identify the backscatter communication devices, and therefore can not send messages to the specified backscatter communication device. Furthermore, multiple backscatter communication devices are prone to causing interference to each other, thus reducing the transmission efficiency of valid data.

Figure 3:
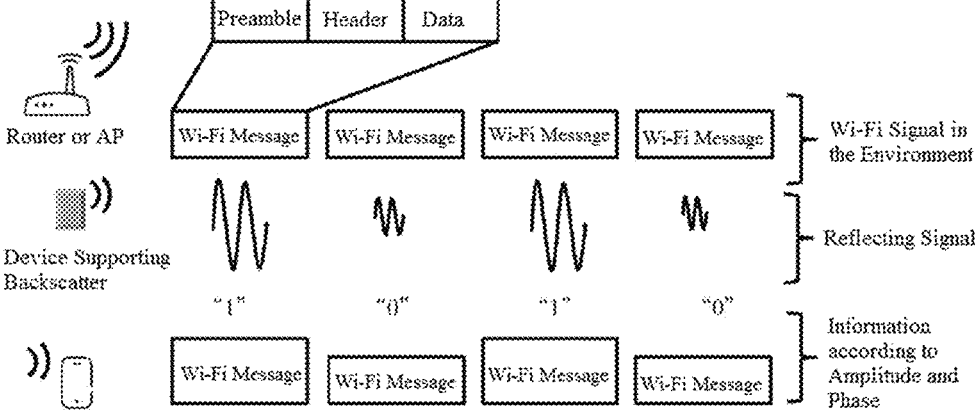
FIG. 3 shows the schematic view of the transmission of bits '1' and '0' in the current backscatter communication scenario.

In the current backscatter communication system, the backscatter communication devices can not generate Wi-Fi specific packets due to the lack of Wi-Fi chips for related firmware. The communication devices that support backscatter are not capable of packaging messages according to the Wi-Fi protocols, i.e., not capable of constructing the bitstreams in the physical layer (PHY) format and the messages in the data link layer (DLL). When a backscatter communication device is about to send a message, it indicates bit information '1' or '0' by adjusting different antenna impedance. With reference to FIG. 3, if the bit to be transmitted is '1', the backscatter communication device automatically adjusts the antenna impedance to reflect the Wi-Fi signal, and if the bit to be transmitted is '0', the backscatter communication device automatically adjusts the antenna impedance to absorb the Wi-Fi signal, i.e., not reflecting the Wi-Fi signal. The Wi-Fi signal reader device decodes the corresponding bit information based on whether it has received the reflected signal.

Figure 4:
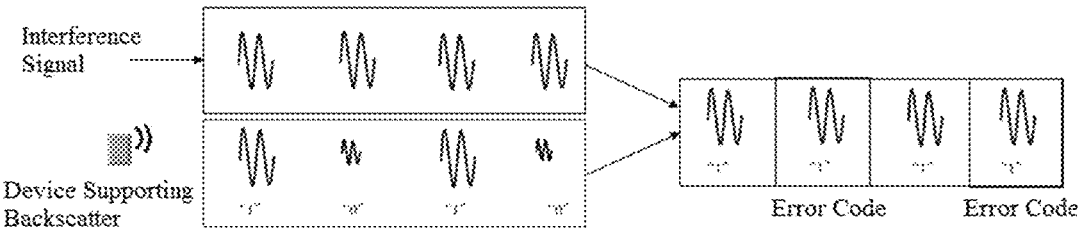
FIG. 4 shows the schematic view of interference signals emerging in the current backscatter communication scenario.

With the transmission mode in the current backscatter communication system, when there are multiple backscatter communication devices in the environment, the Wi-Fi signals are extremely prone to signal interference. With reference to FIG. 4, for example, the backscatter communication device indicates '0' by not reflecting in the encoding process. However, if there is interference signal at this moment, the '0' is very likely to be mistakenly identified as '1'.

Figure 5:
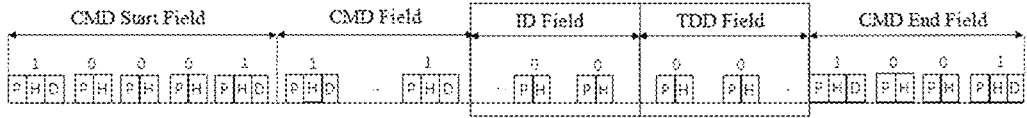
FIG. 5 shows the schematic view of the structure of the backscatter communication message based on Wi-Fi signals in accordance with an example of the present disclosure.

FIG. 5 shows the schematic structural view of the backscatter communication message based on Wi-Fi signals in accordance with an example of the present disclosure.

With joint reference to FIG. 1 and FIG. 5, the present disclosure adds a device ID field (ID Field) and a time slot information field (TDD Field) in the data sequence of the current backscatter communication message as shown in FIG. 1. Wherein, the device ID field is used for indicating the device ID of the backscatter communication device, and the time slot information field is used for indicating the time slot information allocated to the backscatter communication device.

In the structure of the backscatter communication message as shown in FIG. 1 and FIG. 5, the value of the CMD field is set to full '1' to indicate backscatter communication. Those skilled in the art should understand that the CMD field may be extended to indicate different functions/commands by being set to different values. The present disclosure is not limited in this regard.

In accordance with an example of the present disclosure, in order to identify the backscatter communication devices in the environment, the Wi-Fi signal reader device of the present disclosure broadcasts a device query message to instruct the backscatter communication devices upon receiving the device query message to report their respective device ID information. As shown in FIG. 5, the value of the CMD field in the device query message is set to full '1', and the values of the device ID field and the time slot information field are both set to full '0' (default values). By issuing the device query message periodically, the Wi-Fi signal reader device can monitor the number of backscatter communication devices in the environment in real time.

In accordance with an example of the present disclosure, when a backscatter communication device passes information to the Wi-Fi signal reader device, in the backscatter communication message sent by the backscatter communication device, the value of the device ID field is the device ID of the current backscatter communication device, and the value of the time slot information field is the time slot information allocated to the current backscatter communication device.

Figure 6:
FIG. 6 shows the schematic view of the backscatter communication device indicating information bits to the Wi-Fi signal reader device through bit groups in accordance with an example of the present disclosure.

In accordance with an example of the present disclosure and with reference to FIG. 6, the backscatter communication device arranges 2 bits into one group by adjusting different antenna impedance. If the bit group transmitted is '10', i.e., reflecting one backscatter communication message then absorbing one backscatter communication message, it is decoded as bit '1' by the Wi-Fi signal reader device. If the bit group transmitted is '01', i.e., absorbing one backscatter communication message then reflecting one backscatter communication message, it is decoded as bit '0' by the Wi-Fi signal reader device.

Figure 7:
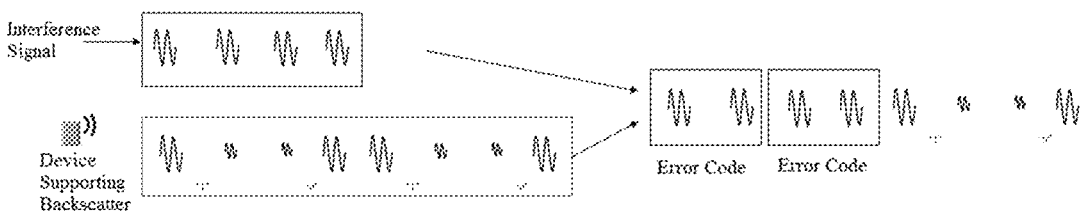
FIG. 7 shows the schematic view of the Wi-Fi signal reader device identifying error code in accordance with an example of the present disclosure.

As shown in FIG. 7, if the received bit group is '11', the Wi-Fi signal reader device identifies it as error code and requests or waits for retransmission from the backscatter communication device. It needs to be noted that since the interference signal can only change '0' to '1', there is no possibility that bit group '00' could occur.

Figure 8:
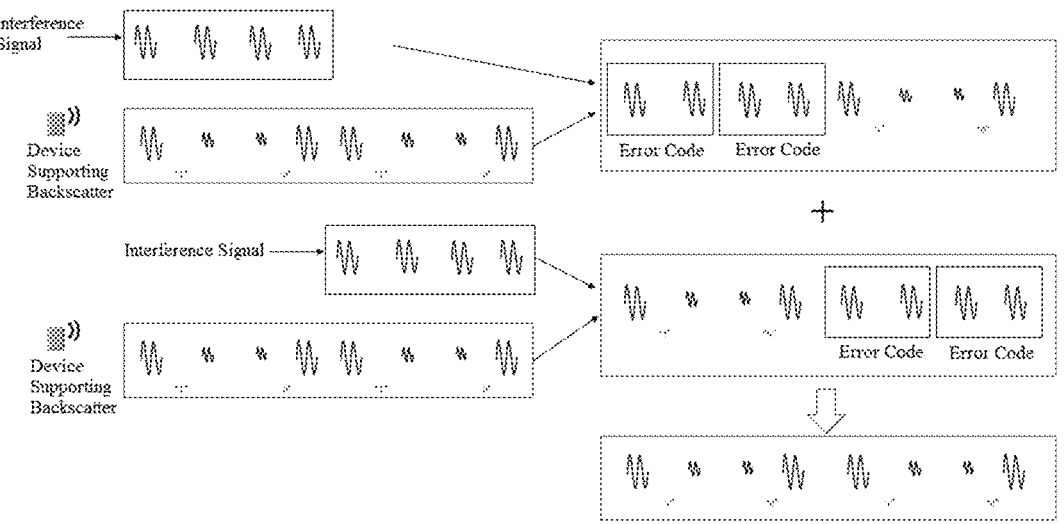
FIG. 8 shows the schematic view of the Wi-Fi signal reader device correcting errors on its own in accordance with an example of the present disclosure.

The Wi-Fi signal reader device saves the correct bits and waits for the next transmission. As shown in FIG. 8, even if the code in the next transmission still has errors, as long as the error bits do not overlap in the two transmissions, for example, when the error bits in the previous transmission are the first two sets of information and the error bits in the next transmission are the last two sets of information just as shown in FIG. 8, the Wi-Fi signal reader device can still correct the errors on its own.

FIG. 9 shows the schematic view of the backscatter communication system based on Wi-Fi signals in accordance with an example of the present disclosure.

As shown in FIG. 9, the Wi-Fi signal reader device 910 and the backscatter communication devices 921 and 922 communicate there between through ambient backscattering using Wi-Fi signals.

The following explanation mainly focuses on the backscatter communication process between the Wi-Fi signal reader device 910 and the backscatter communication device 921. Those skilled in the art should understand that the backscatter communication process between the Wi-Fi signal reader device 910 and the backscatter communication device 922 is the same, and thus will not be elaborated.

FIG. 10 shows the schematic flowchart of the backscatter communication process based on Wi-Fi signals in accordance with an example of the present disclosure.

As shown in FIG. 10, in step 1001, the Wi-Fi signal reader device 910 periodically broadcasts a device query message, which is used for instructing the backscatter communication devices upon receiving the message to report their respective device ID information. The structure of the device query message is as shown in FIG. 5, in which the value of the CMD field is full '1', the value of the ID field is full '0', and the value of the TDD field is full '0'.

In step 1002, the backscatter communication device 921 responds to the device query message by reporting its device ID information to the Wi-Fi signal reader device 910. At this point, the backscatter communication device 921 reflects a backscatter communication message after receiving the device query message from the Wi-Fi signal reader device 910. In the backscatter communication message, the value of the CMD field is full '1', the value of the ID field is the ID of the backscatter communication device 921, and the value of the TDD field is full '0'.

Other backscatter communication devices in the environment will also report their device ID information to the Wi-Fi signal reader device 910 after receiving the device query message.

In step 1003, the Wi-Fi signal reader device 910 counts the number of backscatter communication devices that have reported their respective device ID information and allocates to them the corresponding time slot information.

Figure 11:
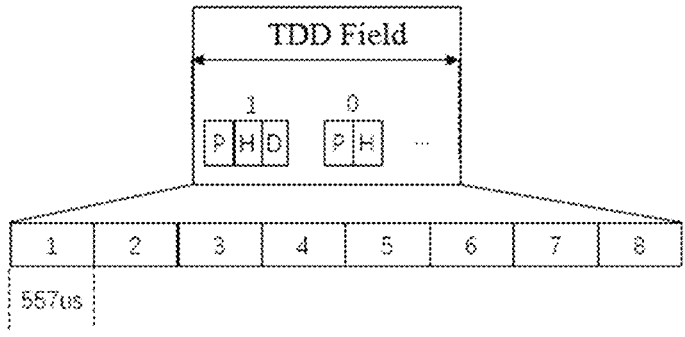
FIG. 11 shows the schematic view of the time slot of the backscatter communication based on Wi-Fi signals in accordance with an example of the present disclosure.

In accordance with an example of the present disclosure, there are preset ID information and preset default time slots in all the backscatter communication devices. With reference to FIG. 11, for example, there are 8 default time slots with each time slot being 557 µs, and 55.7K bits can be transmitted per time slot.

In accordance with an embodiment of the present disclosure, the Wi-Fi signal reader device allots a corresponding number of evenly divided time slots based on the number of IDs of the backscatter communication devices it has received.

For example, assuming that there are 2 backscatter communication devices 921 and 922 in the environment, the Wi-Fi signal reader device 910 receives the IDs responded by the 2 backscatter communication devices 921 and 922, and then allocates the time slots to the 2 backscatter communication devices 921 and 922 in a 1:1 ratio.

Herein, the Wi-Fi signal reader device can allocate the time slots dynamically based on the number of the backscatter communication devices.

Figure 12:
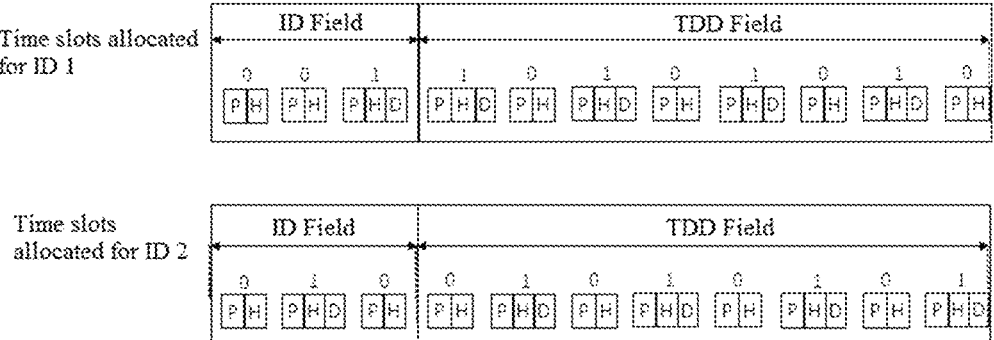
FIG. 12 shows the schematic view of the Wi-Fi signal reader device allocating the time slots evenly to two backscatter communication devices in the environment in accordance with an example of the present disclosure.
Figure 13:
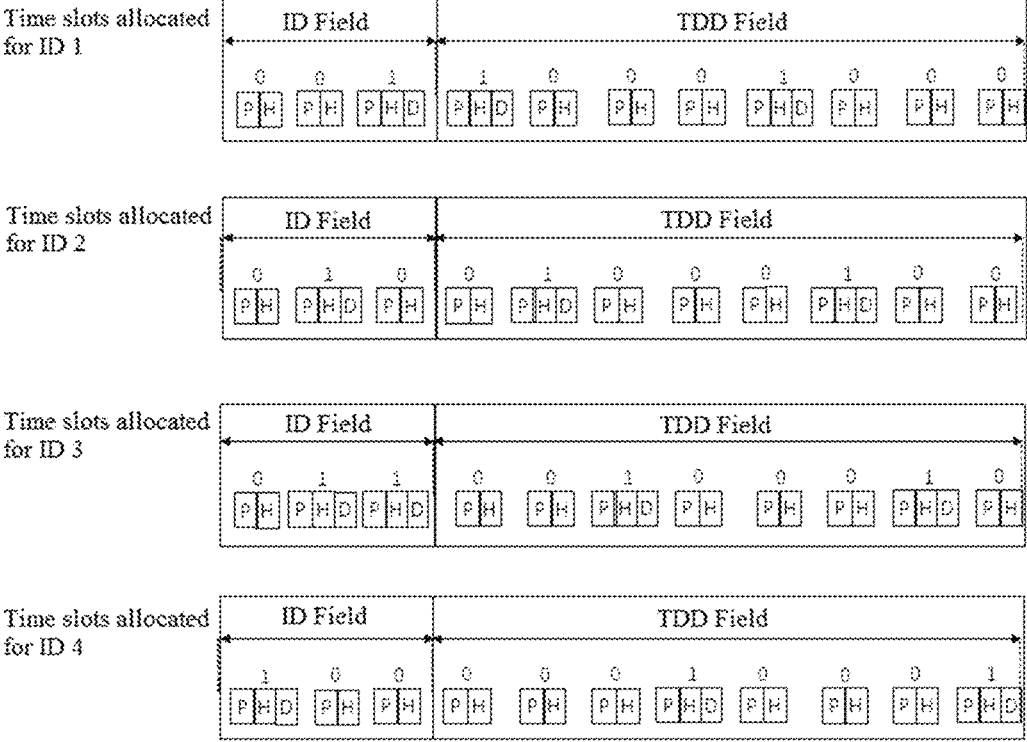
FIG. 13 shows the schematic view of the Wi-Fi signal reader device allocating the time slots evenly to 4 backscatter communication devices in the environment in accordance with an example of the present disclosure.

In accordance with an example of the present disclosure and with reference to FIG. 11, 8 time slots are allotted for the backscatter communication device(s) by default. With reference to FIG. 12, there are 2 backscatter communication devices in the environment, and the Wi-Fi signal reader device allocates the time slots to the two backscatter communication devices in a 1:1 ratio. With reference to FIG. 13, there are 4 backscatter communication devices in the environment, and the Wi-Fi signal reader device allocates the time slots evenly to the four backscatter communication devices.

In accordance with another example of the present disclosure, the Wi-Fi signal reader device may allocate the time slots among the backscatter communication devices that have reported their IDs based on some weighting parameters such as priority, data volume, etc., i.e., uneven allocation. For example, the Wi-Fi signal reader device allocates more time slots to those backscatter communication devices that have larger volume of data to report.

In accordance with an embodiment of the present disclosure, the number of time slots can be extended. When there are more than 8 backscatter communication devices in the environment, the number of time slots is extended to 16. With the default number of time slots being 8 as an example, the rules for extending are as follows:

When the number of backscatter communication devices is 1-8, the number of time slots is 8;

When the number of backscatter communication devices is 9-16, the number of time slots is 16;

When the number of backscatter communication devices is 17-32, the number of time slots is 32;

When the number of backscatter communication devices is 33-64, the number of timeslots is 64;

Assuming the number of backscatter communication devices is N, then: the number of time slots=⌈N/8⌉*8, with '⌈ ⌉' being rounding up.

In accordance with an example of the present disclosure, the Wi-Fi signal reader device notifies the backscatter communication devices of their allocated time slot information. For example, the Wi-Fi signal reader device sends a time slot allocation message to a specific backscatter communication device, in which time slot allocation message, the value of the CMD field is full '1', the value of the ID field is the ID value of the target backscatter communication device, and the value of the TDD field is the time slot information allocated to the target backscatter communication device. Upon receiving the time slot allocation message from the Wi-Fi signal reader device, the backscatter communication device responds with an allocation response message to notify the Wi-Fi signal reader device of the reception of that time slot allocation message.

In this way, the backscatter communication devices 921 and 922 complete the time slot allocation process. Thereafter, the Wi-Fi signal reader device 910 and the backscatter communication devices 921 and 922 may carry out data transmission based on backscatter communication.

According to the allocated time slots, the backscatter communication devices 921 and 922 may send backscatter communication messages to the Wi-Fi signal reader device 910, either proactively or in response. Accordingly, the Wi-Fi signal reader device 910 identifies the respective backscatter communication devices and extracts the transmitted valid data from the backscatter communication messages it has received based on the time slot information allocated to the backscatter communication devices.

Figures 14, 15:
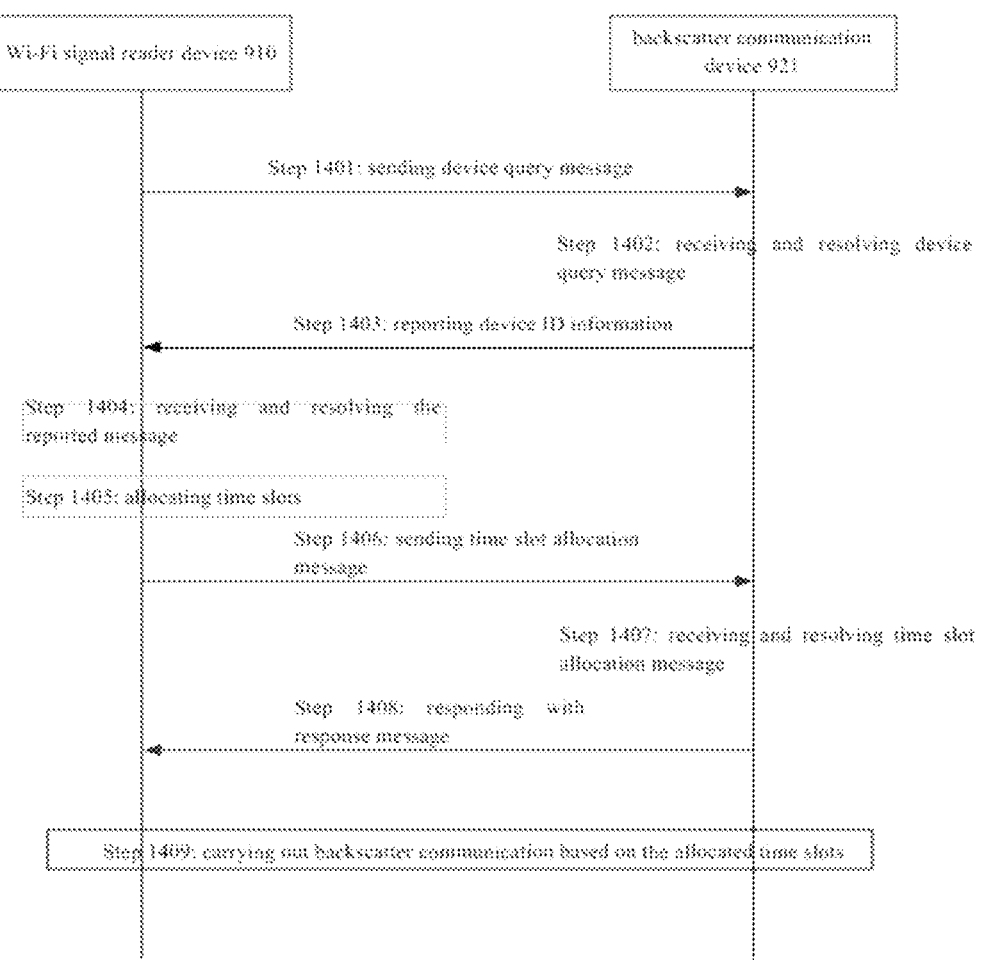
FIG. 14 shows the flowchart of signaling interactions of the backscatter communication based on Wi-Fi signals carried out between the backscatter communication device and the Wi-Fi signal reader device in accordance with an embodiment of the present disclosure.
FIG. 15 shows the schematic view of conflict avoidance of 2 backscatter communication devices while transmitting messages in accordance with an embodiment of the present disclosure.

FIG. 14 shows the flowchart of signaling interactions of the backscatter communication based on Wi-Fi signals carried out between the backscatter communication device and the Wi-Fi signal reader device in accordance with an embodiment of the present disclosure.

With joint reference to FIG. 9, in step 1401, the Wi-Fi signal reader device 910 periodically broadcasts a device query message, which is used for instructing the backscatter communication devices upon receiving the message to report their respective device ID information.

The structure of the device query message is as shown in FIG. 5, in which the value of the CMD Start field is set to '1001', the value of the CMD End field is set to '1001', the value of the CMD field is full '1', the value of the ID field is full '0', and the value of the TDD field is full '0'.

In step 1402, the backscatter communication device 921 receives the device query message from the Wi-Fi signal reader device 910.

Upon receiving the device query message, the backscatter communication device 921 detects the CMD Start field therein, and if the value of the CMD Start field is not '1001', the backscatter communication device 921 neither performs the follow-up identification nor responds to the message. If the value of the CMD End field in the message is not '1001', it is deemed that there is interference signal in the environment. For example, bits of other interference signals are inserted, causing the expected value of the CMD End field to shift backwards. At this point, the backscatter communication device 921 checks the value of the ID field, if it is full '0', the backscatter communication device 921 determines that it has received the device query message sent by the Wi-Fi signal reader device 910; and if it is not full '0', the backscatter communication device 921 determines that it has received the reflected signal from other backscatter communication devices.

The backscatter communication device 922 will also receive the device query message from the Wi-Fi signal reader device 910.

In step 1403, the backscatter communication device 921 responds to the device query message from the Wi-Fi signal reader device 910 by reporting the device ID information of the current device.

At this point, the backscatter communication device 921 reflects a backscatter communication message after receiving the device query message from the Wi-Fi signal reader device 910. In the backscatter communication message, the value of the CMD field is full '1', the value of the ID field is the ID of the backscatter communication device 921, and the value of the TDD field is full '0'.

In accordance with an example of the present disclosure and with reference to FIG. 15, for example, there are two backscatter communication devices 921 and 922 in the current environment. The backscatter communication device 921 does not receive any backscatter communication message from other backscatter communication devices during the random waiting time in a time slot, begins to reflect a backscatter communication message, and adds its own ID (ID 1) and time slot information (e.g., '10000000') by encoding. The backscatter communication device 922 detects the reception of the message reflected by the backscatter communication device 921 during a random waiting time in a time slot, then waits for that time slot to expire. During the random waiting time in the next time slot, the backscatter communication device 922 does not receive any reflected message from other backscatter communication devices, begins reflection, and adds its own ID (ID 2) and time slot information (e.g., '01000000') by encoding.

To ensure that the Wi-Fi signal reader device 910 receives the backscatter communication message responded by the backscatter communication device 921, the response by the backscatter communication device 921 needs to be transmitted n times in a row, for example three times. Other backscatter communication devices are, in turn, in a waiting state, and monitor for conflicts.

If the Wi-Fi data rate in the environment is X Mbps, i.e., X bits per microsecond, and each time slot is T µs, X*557 bits can be transmitted per time slot.

The length of a complete backscatter communication message is:

(Preamble+Header+Data Load)*Y+(Preamble+Header)*Z

Wherein, Y is the number of Wi-Fi frames containing data load, and Z is the number Wi-Fi frames not containing data load.

Therefore, the number of backscatter communication messages that can be transmitted per time slot in the ideal situation is:

X*T)/((Preamble+Header+Data Load)*Y+(Preamble+Header)*Z)

Take the Wi-Fi 5 entry rate of 433 Mbps for example, if the Wi-Fi rate in the environment is 400 Mbps, 400 bits can be transmitted per microsecond.

Assuming 557 µs per time slot, 400*557=222800 bits can be transmitted per time slot.

Figure 16:
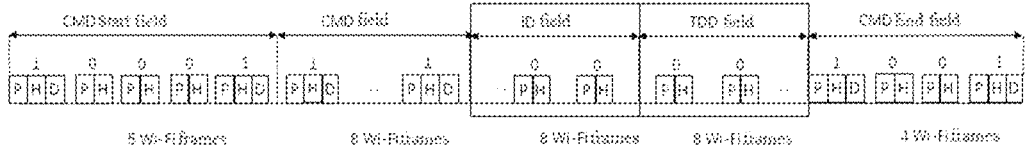
FIG. 16 shows the complete format of a backscatter communication message in accordance with an embodiment of the present disclosure.
Figure 17:
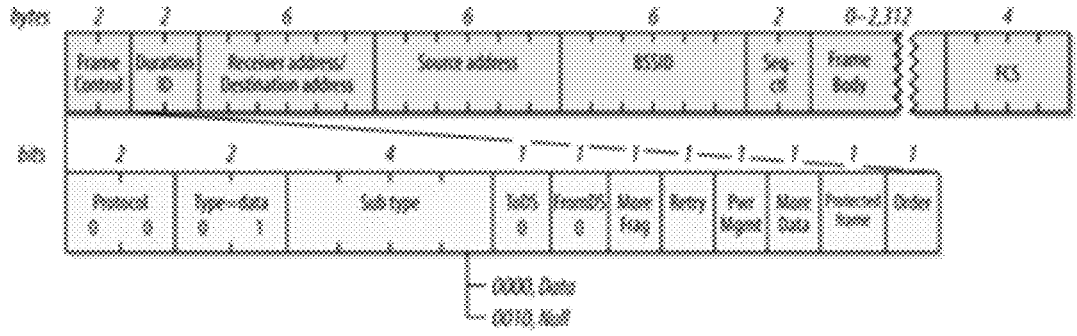
FIG. 17 shows the schematic view of the structure of an IBSS data frame.

With reference to FIG. 16, the format of a complete backscatter communication message is shown, which consists of 33 Wi-Fi frames in total. Accordingly, the length of the maximum backscatter communication message (with the CMD field, ID field and TDD field all being full '1') =PHD*28+PH*5. With reference to FIGS. 16 and 17, minimum PHD information (frame body is 1 byte) length=2+2+6+6+6+2+1+4=29 bytes=232 bits;

maximum PHD information (frame body is 2312 bytes) length=2+2+6+6+6+2+2312+4=2340 bytes=18720 bits;

PH information (frame body is 0 byte) length=2+2+6+6+6+2+0+4=28 bytes=224 bits.

When the PHD information length is 232 bits, the length of the maximum backscatter communication message (with the CMD field, ID field and TDD field all being full '1')=232*28+224*5=7616 bits; 222800 bits/7616 bits=29.25; in the ideal situation, 29 backscatter communication messages can be transmitted per time slot.

When the PHD information length is 18720 bits, the length of the maximum backscatter communication message (with the CMD field, ID field and TDD field all being full '1')=18720*28+224*5=525280 bits; 222800 bits/525280 bits=0.42; in the ideal situation, 0.4 backscatter communication messages can be transmitted per time slot.

Returning to FIG. 14, in step 1404, the Wi-Fi signal reader device 910 receives the device ID information reported by the backscatter communication device 921.

At this point, the backscatter communication device 921 indicates bit information '1' or '0' by adjusting different antenna impedance. By arranging 2 bits into one group, if the transmitted bits are '10', the Wi-Fi signal reader device 910 decodes it as '1'. If the transmitted bits are '01', the Wi-Fi signal reader device 910 decodes it as '0'. If the Wi-Fi signal reader device 910 receives '11', it identifies as error code.

Since the backscatter communication device 921 will transmit the same backscatter communication message to the Wi-Fi signal reader device 910 multiple times in a row, when there is error code, the Wi-Fi signal reader device 910 can identify the error bits as long as the error bits do not overlap. With reference to FIG. 8, for example, when there is error code, the Wi-Fi signal reader device 910 saves the correct code bits (such as the last two sets of code bits) in the current backscatter communication message and waits for the next transmission. Even if there is still error code in the next transmission (such as the first two sets of code bits), the Wi-Fi signal reader device 910 can correct errors on its own as long as the error bits in the same backscatter communication message of the two transmissions do not overlap. For example, the correct code bits in the two transmissions are put together into a complete message for further resolving.

Other backscatter communication devices in the environment upon receiving the device query message from the Wi-Fi signal reader device 910 will also report their own device ID information to the Wi-Fi signal reader device 910.

In step 1405, the Wi-Fi signal reader device 910 counts the number of backscatter communication devices that have reported their respective device ID information and allocates to them the corresponding time slot information.

In accordance with an example of the present disclosure, there are preset ID information and preset default time slots in all the backscatter communication devices. For example, there are 8 default time slots with each time slot being 557 µs.

In accordance with an embodiment of the present disclosure, the Wi-Fi signal reader device 910 allots a corresponding number of evenly divided time slots based on the number of IDs of the backscatter communication devices it has received.

For example, there are 2 backscatter communication devices 921 and 922 in the environment. The Wi-Fi signal reader device 910 receives the IDs returned by the 2 backscatter communication devices 921 and 922, and then allocates the time slots to the 2 backscatter communication devices 921 and 922 in a 1:1 ratio.

Herein, the Wi-Fi signal reader device can allocate the time slots dynamically based on the number of the backscatter communication devices.

In accordance with an example of the present disclosure and with reference to FIG. 11, 8 time slots are allotted for the backscatter communication device(s) by default. With reference to FIG. 12, there are 2 backscatter communication devices in the environment, and the Wi-Fi signal reader device allocates the time slots to the two backscatter communication devices in a 1:1 ratio. With reference to FIG. 13, there are 4 backscatter communication devices in the environment, and the Wi-Fi signal reader device allocates the time slots evenly to the four backscatter communication devices.

In step 1406, the Wi-Fi signal reader device 910 notifies the backscatter communication device 921 of its allocated time slot information.

As for other backscatter communication devices that have reported their own ID information, the Wi-Fi signal reader device 910 will also notify them of their allocated time slot information.

Figure 18:
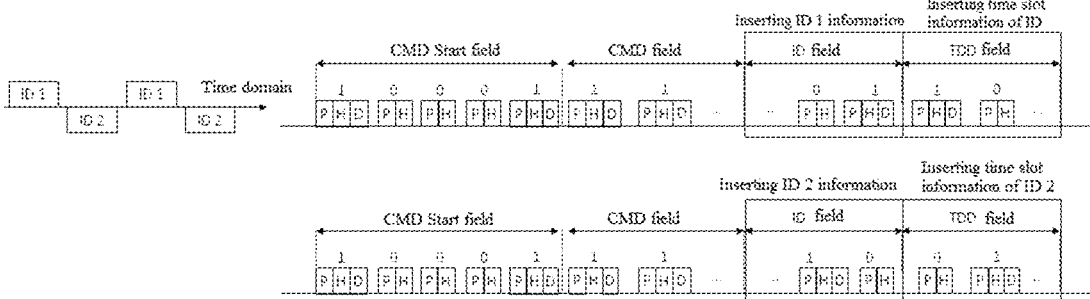
FIG. 18 shows the schematic view of the Wi-Fi signal reader device sending time slot allocation messages to two backscatter communication devices in the environment in accordance with an embodiment of the present disclosure.

With reference to FIG. 18, for example, the Wi-Fi signal reader device 910 sends a time slot allocation message to the backscatter communication devices, in which time slot allocation message, the value of the CMD field is full '1', the value of the ID field is the ID value of the target backscatter communication device, and the value of the TDD field is the time slot information allocated to the target backscatter communication device.

The Wi-Fi signal reader device 910 sends backscatter communication messages with corresponding time slot information only when time slot allocation is required, and the time slot information of other backscatter communication messages are set to full '0' to distinguish between the sending devices of the backscatter communication messages.

In step 1407, the backscatter communication device 921 receives the time slot allocation message issued by the Wi-Fi signal reader device 910.

The backscatter communication device 921 first identifies the CMD field to confirm the message type, and then determines the ID information in the identified time slot allocation message. If the ID information is consistent with the ID of the current device, the TDD information is extracted; if the ID information is not consistent with the ID of the current device, the message is dropped directly.

In step 1408, upon receiving the time slot allocation message from the Wi-Fi signal reader device 910, the backscatter communication device 921 responds with an allocation response message to notify the Wi-Fi signal reader device 910 of the reception of that time slot allocation message.

The backscatter communication device 922 performs the same responding operation.

Figure 19:
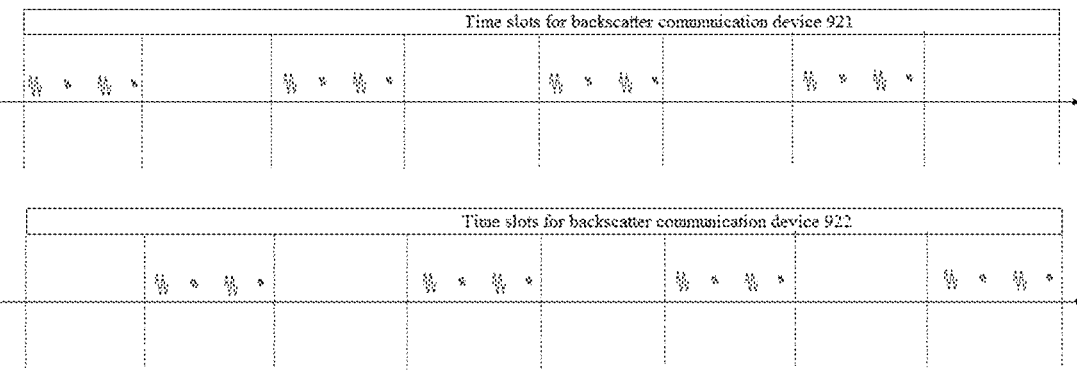
FIG. 19 shows the schematic view of two backscatter communication devices reflecting allocation response messages to the Wi-Fi signal reader device according to their respective time slots in accordance with an example of the present disclosure.

Here in accordance with an example of the present disclosure, when there are two backscatter communication devices in the environment, e.g., backscatter communication devices 921 and 922 as shown in FIG. 19, the two backscatter communication devices respond with messages to the Wi-Fi signal reader device 910 based on their respectively allocated time slots.

Figure 20:
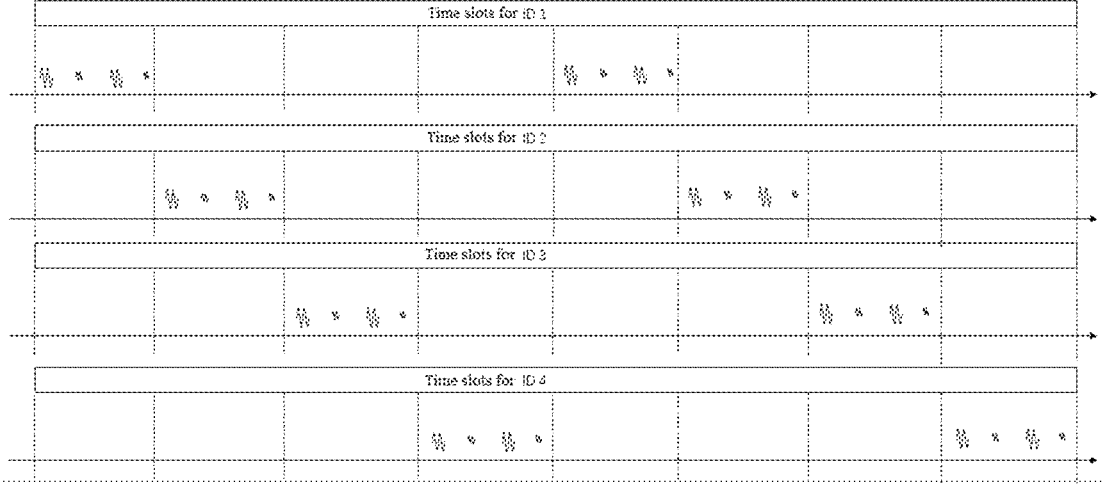
FIG. 20 shows the schematic view of 4 backscatter communication devices reflecting allocation response messages to the Wi-Fi signal reader device according to their respective time slots in accordance with an example of the present disclosure.

In accordance with another example of the present disclosure, when there are 4 backscatter communication devices in the environment as shown in FIG. 20, the 4 backscatter communication devices (ID 1-4) respond with messages to the Wi-Fi signal reader device based on their respectively allocated time slots.

At this point, the time slot configuration for the backscatter communication devices is completed, and they may then deliver data with the Wi-Fi signal reader device 910. For example, the backscatter communication device 921 transmits the data it has acquired in the allocated time slots to the Wi-Fi signal reader device 910.

In step 1409, the backscatter communication devices carry out data transmission with the Wi-Fi signal reader device 910 based on the allocated time slots.

Figures 21, 22:
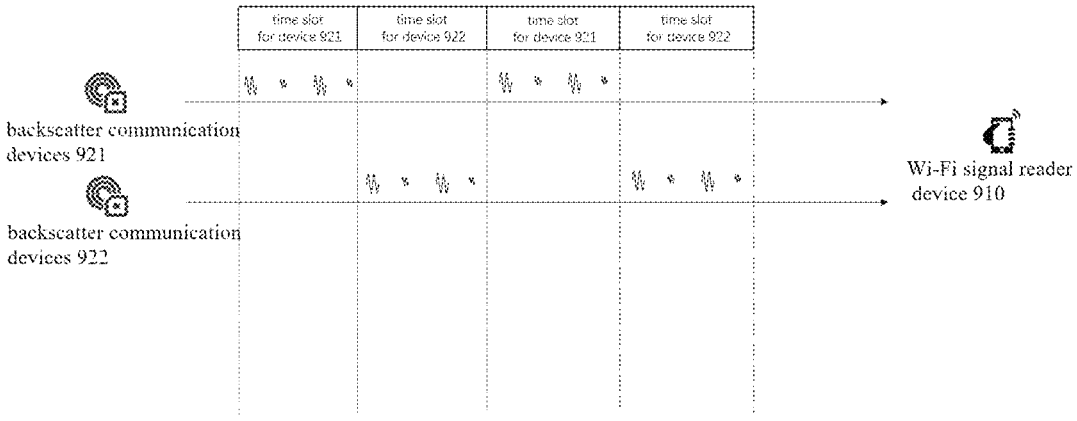
FIG. 21 shows the schematic view of two backscatter communication devices uploading messages to the Wi-Fi signal reader device according to their respective time slots in accordance with an example of the present disclosure.
FIG. 22 shows the schematic view of the Wi-Fi signal reader device resolving respectively the messages of two backscatter communication devices in accordance with an example of the present disclosure.

In accordance with another example of the present disclosure and with reference to FIG. 21, the backscatter communication devices 921 and 922 upload data to the Wi-Fi signal reader device 910 in their respectively allocated time slots. With reference to FIG. 22, the Wi-Fi signal reader device 910 receives and resolves the messages from the backscatter communication devices 921 and 922 based on the respective time slots of the two.

As for the backscatter communication devices, they can not tell whether the received message is one that is reflected by other backscatter communication devices or sent by the Wi-Fi signal reader device 910 based on the value of its ID field alone.

At this point, the backscatter communication devices may achieve the purpose of differentiation based on the value of the TDD field.

When a backscatter communication device performs reflection, it must encode its own TDD value. A message with the TDD field being full '0' can be identified as one sent by the Wi-Fi signal reader device 910.

When a backscatter communication device receives a message whose ID value matches its own ID and whose TDD field is not full '0', it checks whether the TDD value of the message is the same as its own TDD. If the two are different, the backscatter communication device identifies the message as one sent by the Wi-Fi signal reader device 910; if the two are the same, the backscatter communication device directly absorbs the message without responding.

It needs to be noted that the embodiments of the present disclosure can be implemented in software and/or a combination of software and hardware. For example, the embodiments of the present disclosure can be implemented by using an Application Specific Integrated Circuit (ASIC), a general-purpose computer or any other similar hardware devices. In one embodiment, the software program of the embodiments of the present disclosure may be executed by a processor to implement the steps or functions described hereinabove. Likewise, the software program of the embodiments of the present disclosure (including the relevant data structures) may be stored in a computer readable recording medium, for example, a RAM memory, a magnetic or optical drive, or a floppy disk, and other similar devices. In addition, some steps or functions of the embodiments of the present disclosure may be implemented by hardware, for example, as a circuit cooperating with a processor to execute various functions or steps.

In addition, at least a portion of the embodiments of the present disclosure may be applied as a computer program product, for example, computer program instructions which, when executed by a computing device, may invoke or provide the methods and/or technical solutions in accordance with the embodiments of the present disclosure through operations of the computing device. Furthermore, the program instructions invoking the methods of the embodiments of the present disclosure may be stored in a fixed or mobile recording medium, and/or transmitted through broadcast or data flow in other signal bearing media, and/or stored in a working memory of a computing device which operates according to the program instructions.

To those skilled in the art, it is apparent that the embodiments of the present disclosure are not limited to the details of the illustrative embodiments mentioned above, and can be implemented in other specific forms without departing from the spirit or basic features of the embodiments of the present disclosure. Therefore, from any perspective, the embodiments should be regarded as illustrative and not restrictive. The scope of the embodiments of the present disclosure is defined by the appended claims and not the depiction above. Therefore, all variations within the meaning and scope of equivalent elements of the claims are intended to be encompassed within the embodiments of the present disclosure. No reference numerals in the claims should be regarded as limiting the involved claims. In addition, it is apparent that the word 'comprise' or 'include' does not exclude other units or steps, and singularity does not exclude plurality. A plurality of units or apparatuses stated in a system claim may also be implemented by a single unit or apparatus through software or hardware. Words like 'first' and 'second' are used to indicate names and not to indicate any specific order.

The invention claimed is:

1. A method of ambient backscattering communication using Wi-Fi signals, wherein the method comprises the following steps:

a Wi-Fi signal reader device periodically broadcasts a device query message to instruct backscatter communication devices upon receiving the device query message to report their respective device ID information;

said backscatter communication devices report their device ID information to said Wi-Fi signal reader device in response to said device query message;

said Wi-Fi signal reader device counts a number of the backscatter communication devices that have reported their respective device ID information, and allocates to the backscatter communication devices corresponding time slot information, wherein messages transmitted between the Wi-Fi signal reader device and a backscatter communication device include a device ID field and a time slot information field, the device ID field indicating a device ID of the backscatter communication device, and the time slot information field indicating the time slot information allocated to the backscatter communication device.

2. The method according to claim 1, wherein the step of said Wi-Fi signal reader device allocating said time slot information further comprises:

said Wi-Fi signal reader device allocates the time slots evenly according to the number of the backscatter communication devices that have reported their respective device ID information.

3. The method according to claim 1, wherein the method further comprises the following step:

said backscatter communication device carries out backscatter communication with said Wi-Fi signal reader device according to the allocated time slots.

4. The method according to claim 1, wherein said backscatter communication device arranges 2 bits into one group to indicate bit '1' to said Wi-Fi signal reader device with a bit group '10', and to indicate bit '0' to said Wi-Fi signal reader device with a bit group '01'.

5. A Wi-Fi signal reader device that carries out backscatter communication based on Wi-Fi signals, said Wi-Fi signal reader device comprises a processor and a memory with computer executable instructions included therein, and said Wi-Fi signal reader device is configured to perform the following operations when said computer executable instructions are executed by said processor:

broadcasting periodically a device query message to instruct backscatter communication devices upon receiving said device query message to report their respective device ID information;

counting a number of the backscatter communication devices that have reported their respective device ID information, and allocating to the backscatter communication devices corresponding time slot information, wherein messages transmitted between the Wi-Fi signal reader device and a backscatter communication device include a device ID field and a time slot information field, the device ID field indicating a device ID of the backscatter communication device, and the time slot information field indicating the time slot information allocated to the backscatter communication device.

6. The Wi-Fi signal reader device according to claim 5, wherein said Wi-Fi signal reader device is further configured to perform the following operation:

carrying out error correction on received information according to at least two messages sent consecutively by said backscatter communication device, wherein error bits in said at least two same messages that are sent consecutively do not overlap;

wherein said backscatter communication device arranges 2 bits into one group to indicate bit '1' to said Wi-Fi signal reader device with a bit group '10', and to indicate bit '0' to said Wi-Fi signal reader device with a bit group '01'.

7. The Wi-Fi signal reader device according to claim 6, wherein the operation of said Wi-Fi signal reader device allocating said time slot information further comprises:

allocating time slots evenly according to the number of the backscatter communication devices that have reported their respective device ID information.

8. The Wi-Fi signal reader device according to claim 6, wherein said Wi-Fi signal reader device is further configured to perform the following operation:

carrying out backscatter communication with said backscatter communication device based on time slots allocated to said backscatter communication device.

9. A backscatter communication device that carries out backscatter communication based on Wi-Fi signals, said backscatter communication device comprises a processor and a memory with computer executable instructions included therein, and said backscatter communication device is configured to perform the following operations when said computer executable instructions are executed by said processor:

reporting device ID information of the backscatter communication device to a Wi-Fi signal reader device in response to a device query message therefrom;

acquiring time slot information allocated by said Wi-Fi signal reader device, wherein messages transmitted between the backscatter communication device and the Wi-Fi signal reader device include a device ID field and a time slot information field, the device ID field indicating a device ID of the backscatter communication device, and the time slot information field indicating the time slot information allocated to the backscatter communication device.

10. The backscatter communication device according to claim 9, wherein said operation of acquiring said time slot information further includes:

receiving a time slot allocation message from said Wi-Fi signal reader device; and responding to said Wi-Fi signal reader device with a response message according to the allocated time slot information.

11. The backscatter communication device according to claim 9, wherein before reflecting a message, said backscatter communication device:

waits, as an operation, randomly for a period of time in a time slot, and continues to wait till a next time slot if the backscatter communication device receives any message reflected by other backscatter communication devices; and performs the operation in said next time slot until no more conflict is detected in the time slot that follows, then transmits a message to said Wi-Fi signal reader device.

12. The backscatter communication device according to claim 9, wherein said backscatter communication device:

arranges 2 bits into one group to indicate bit '1' to said Wi-Fi signal reader device with a bit group '10', and to indicate bit '0' to said Wi-Fi signal reader device with a bit group '01'.

13. The backscatter communication device according to claim 9, wherein said backscatter communication device is further configured to perform the following operation:

carrying out backscatter communication with said Wi-Fi signal reader device according to allocated time slots.

\* \* \* \* \*